C. R. GORGAS & W. H. SMITH.
CASTOR.
No. 32,766. Patented July 9, 1861.
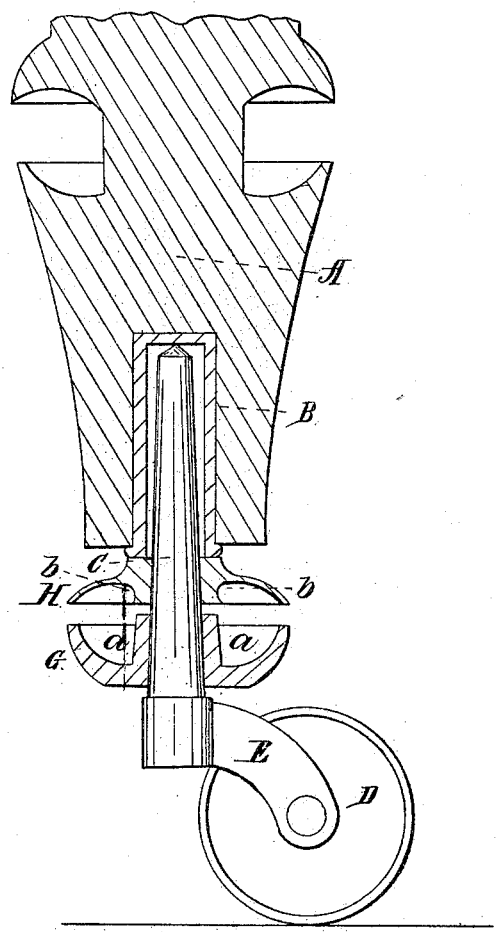

UNITED STATES PATENT OFFICE.

CHAS. R. GORGAS AND WM. H. SMITH, OF WOOSTER, OHIO.

FURNITURE-CASTER.

Specification of Letters Patent No. 32,766, dated July 9, 1861.

*To all whom it may concern:*

Be it known that we, CHARLES R. GORGAS and WILLIAM H. SMITH, of Wooster, in the county of Wayne and State of Ohio, have invented a new and useful Improvement in Casters for Furniture-Legs; and we do hereby declare that the following is a full, clear, and exact description thereof, reference being had to the accompanying drawing, making a part of this specification, which is a side sectional elevation of our improvement applied to a bedstead-leg.

Similar letters of reference indicate corresponding parts.

Our invention relates to that class of casters which contain an insect trap to prevent the passage of insects up the legs of articles of furniture to which they are applied, and the invention particularly consists in a certain combination of parts to render such casters cheaper in construction, more efficient in action and capable of being more readily cleansed.

To enable those skilled in the art to make and apply our invention, we will proceed to describe its construction and operation.

A is a portion of the leg of a bedstead or other article of furniture and B is a metal socket let into the end of A, to receive the pin C of the caster, of which D is the roller and E the pivoted arms to which the roller is attached.

The caster resembles any ordinary caster, such as is used on furniture, and it is applied to the leg in the usual manner. The cups G, H are placed on the stem of the caster between the collar of arms E and the bottom of the socket B as shown in the figure and they allow the stem to turn freely in its socket.

The cup G is made of metal: its shape is concavo-convex, with a hollow neck *a* rising from its center; it is made quite deep and of a suitable diameter, to hold any suitable liquid which will be repulsive to insects. The neck *a* projects above the edge of the cup, and upon the end rests upon the neck *b* of another cup or cap H, which may be somewhat shallower than the lower cup. This cap H is also of a concavo convex shape and about the same diameter as the cup G. It is inverted over this cup G and the edges of the two cups are kept at such a distance apart that the bugs cannot pass over the cups from one edge to the other.

It will be seen from this description that no bugs can ascend this caster as they would be arrested by the liquid in cup G. The cap H affords an additional security against the passage of insects.

We are aware that furniture casters have previously been provided with cups to contain a fluid to prevent the passage of insects, and we do not therefore desire to be understood as claiming novelty in the above invention irrespective of the specific construction and combination of parts described. In our invention the cups G and H, are simply slipped over the conical pin C; the cup H, forming a shoulder which bears against the lower end of the socket B, and the necks *a*, and *b*, acting to prevent the edges of the cups approaching too closely while at the same time the caster and its accessories may be entirely taken apart when needful for cleansing or other purposes and being self adjusting may be instantly put together again without requiring any special care.

Having thus described our invention we claim as new and desire to secure by Letters Patent as an improved article of manufacture—

The combination of the socket B, conical pin C, cups G and H, necks *a*, and *b*, and roller D, all constructed and operating in the manner and for the purpose herein shown and explained.

CHAS. R. GORGAS.
W. H. SMITH.

Witnesses:
J. C. SMITH,
I. EMRICK.